Figure 1:
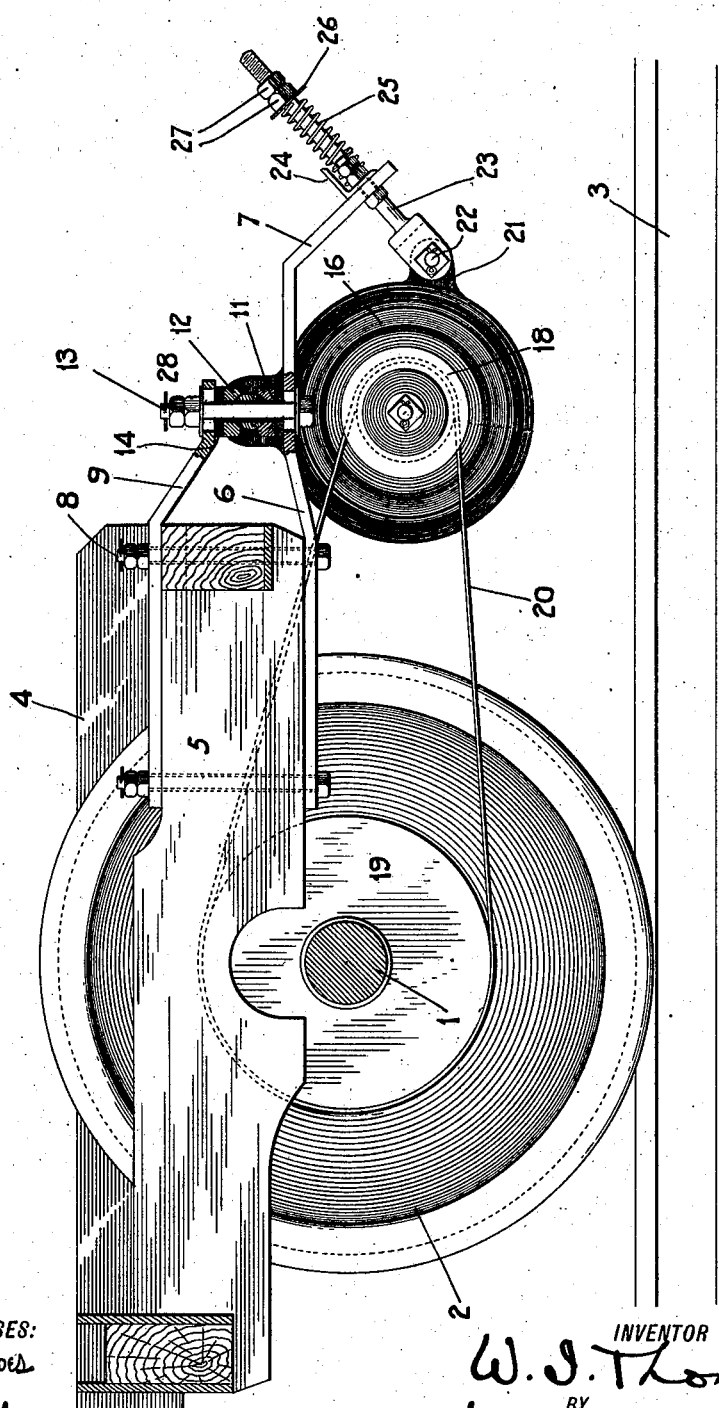

No. 881,743. PATENTED MAR. 10, 1908.
W. I. THOMSON.
DYNAMO SUSPENSION.
APPLICATION FILED NOV. 6, 1905.

2 SHEETS—SHEET 1.

WITNESSES:
Lindsley Schepmoes
Robert S. Blair

INVENTOR
W. I. Thomson
BY
Warfield & Duell
ATTORNEYS.

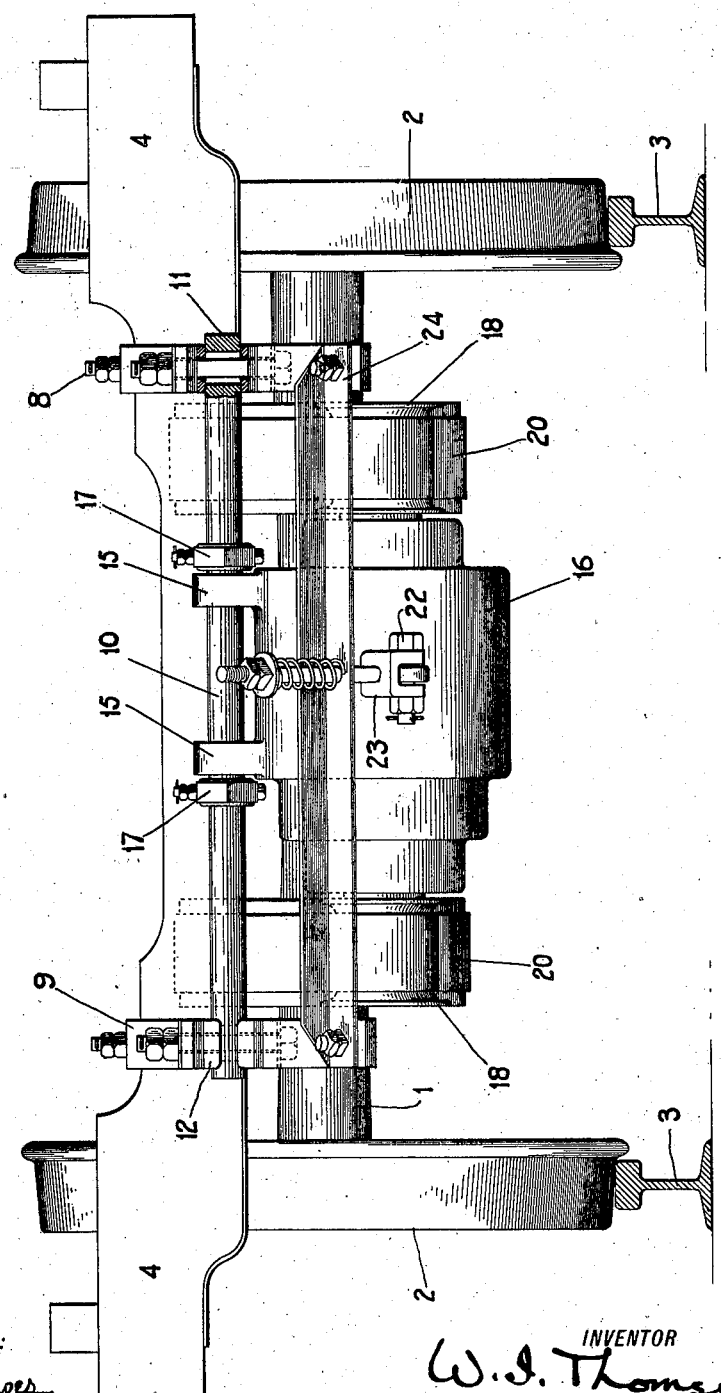

UNITED STATES PATENT OFFICE.

WILLIAM I. THOMSON, OF NEWARK, NEW JERSEY, ASSIGNOR TO THE SAFETY CAR HEATING & LIGHTING COMPANY, A CORPORATION OF NEW JERSEY.

DYNAMO SUSPENSION.

No. 881,743.      Specification of Letters Patent.      Patented March 10, 1908.

Application filed November 6, 1905. Serial No. 285,980.

*To all whom it may concern:*

Be it known that I, WILLIAM I. THOMSON, residing at Newark, in the county of Essex and State of New Jersey, have invented certain new and useful Improvements in Dynamo Suspension, of which the following is a full, clear, and exact description, such as will enable others skilled in the art to which it appertains to make and use the same.

This invention relates to the mounting of electrical machinery and, with regard to its more specific features, to the mounting of a dynamo upon a car and connected with the axle thereof.

One of the objects thereof is to provide simple means for mounting a dynamo, whereby the same is readily adjusted and securely held in its adjusted position.

Another object is to provide efficient and durable means for suspending a dynamo in operative relation to a car axle.

Other objects will be in part obvious and in part pointed out hereinafter.

The invention accordingly consists in the features of construction, combinations of elements and arrangements of parts, which will be exemplified in the apparatus hereinafter described and the scope of the application of which will be indicated in the following claims.

In the accompanying drawings, wherein is shown one of the various possible embodiments of my invention,—Figure 1 is a side elevation of the same, certain parts being broken away. Fig. 2 is an end elevation, also showing certain parts broken away in order to disclose the structure more clearly.

Similar reference characters refer to similar parts throughout both views of the drawings.

In order to render clearer certain of the several features of my invention, it may here be noted that I have found that in the case of dynamos connected with car axles it is highly desirable that means be provided for adjusting the parts even after the machine is mounted in position, inasmuch as it is impracticable to place the same, when first mounted, in the exact position at which it will act most efficiently. Moreover, on account of the limited space and the severe conditions obtaining in the case of electrical machinery mounted in the above relation, it is of marked value that such means of adjustment be readily accessible and be of the simplest and most durable construction.

The above and other advantages are attained in constructions of the nature of that hereinafter described.

Referring now to the accompanying drawings, there is shown at 1 a car axle provided with the customary wheels 2 adapted to run upon the rails 3. Upon this car axle is mounted a truck 4 of any desired construction, the same in itself forming no part of the present invention. Upon the lower surface of the truck members 5, are bolted the straps 6, the same extending in a substantially horizontal direction and being provided with depending ends 7, for a purpose hereinafter described.

Secured to the upper surface of the truck members 5, as by the bolts 8, are straps 9 projecting over the straps 6 and having bolted between their free ends and the opposite portions of the latter members a cross-bar 10. This cross-bar is interposed between bearing blocks 11 and 12 respectively resting against the straps 6 and 9, and is held in position at each end by bolts 13 passing through the above several parts and shims 14. The openings within straps 6 and 9 through which the bolts 13 pass are elongated in what may be termed a longitudinal direction, by which is meant a direction substantially parallel to the rail. The cross-bar 10 is also provided with elongated slots through which the bolts 13 pass, the major diameter of the slots being in this instance transverse to the direction of travel of the truck.

Mounted upon the cross-bar 10, as by the heavy perforated lugs 15, is a dynamo 16 of any desired construction, the same forming in itself no part of the present invention. It may here be noted that the term "dynamo" is used throughout this specification and the following claims in what is believed to be its accurate technical meaning, namely, as designating a piece of electrical machinery which is employed either to generate electric current or to transform the same into mechanical energy. At the outer sides of the lugs 15 are adjustably secured upon the cross-bar 10 the collars 17, which serve to prevent transverse displacement of the dynamo.

Upon the shaft of dynamo 16 are fixed pulleys 18, in this case two in number, although it will be obvious that for the purposes of embodying the present invention one only is necessary. Pulleys 18 are opposite driving pulleys 19 fast upon the car axle 1 and are connected therewith as by belts 20. It may here be noted that although a belt drive is preferred in practical use, nevertheless many features of my invention are independent of the particular power-transmitting means employed.

Upon the side of dynamo 16, remote from the axle 1, is formed a lug 21, to which is secured as by bolt 22 a clevis 23 the threaded outer end or shank of which passes through a cross-bar 24 bolted between the free depending ends 7 of the straps 6. About clevis 23 is a coil spring 25 which is compressed between cross-bar 24 and a washer 26, the latter part being held in position by lock nuts 27.

The method of use and operation of the above-described embodiment of my invention is as follows: The generator 16 is swung into position by means of the cross-bar 10, the collars 17 being secured upon the cross-bar at such points as to bring the dynamo substantially into the desired position with the ends of the bar resting between the blocks 11 and 12. As above set forth, however, it is usually impracticable to predetermine the precise point at which the dynamo will act most efficiently, and the pivotal cross-bar 10 is readily adjusted into any desired position by reason of the disposition of the above-described slots in the ends thereof and adjacent portions of the straps. When a desired adjustment of the dynamo has been attained, the blocks 11 and 12 are firmly clamped about the cross-bar 10 by means of bolts 13, and the position of the supporting lugs 15 is thus fixed. Belts being mounted so as to connect the corresponding pulleys, the spring 25 is compressed, as by means of lock nuts 27, so as to bring the desired tension upon the belts and by reason of the adjustability of the pivotal point 28, this exact tension may be reached without swinging the dynamo to either one or the other side of the supporting bar. It will thus be seen that I have provided simple, durable and practicable mechanism well adapted to accomplish all of the objects of my invention. Owing to the fact that the dynamo is suspended from its uppermost portion, it is always in a state of stable equilibrium, and by reason of the adjustment of its point of support it may be maintained substantially vertically below the same without sacrificing the range of adjustability of the tension upon the belt. In such position, the effect of any jars does not tend to swing the dynamo and either slacken or tauten the driving belt.

The disposition of the belt-tightening means, moreover, upon the side of the dynamo remote from the axle with which it is connected, permits the exerting of a resilient pull upon this machine opposing and equal to the resilient pull exerted thereon by the driving belt, and it will readily be seen that these forces may be nicely balanced and that there is no chance of the same being thrown out of adjustment by the buckling or bending of the adjusting member, in this case the clevis 23, as the force thereon is one of tension tending to strengthen rather than to compress and bend the same. The simple and yet efficient manner in which the several parts may be adjusted should also be clearly apparent, it being unnecessary to pass beneath the car for this purpose as, the belts 20 being loosened, an adjustment either in a transverse or longitudinal direction is easily accomplished.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention, which, as a matter of language, might be said to fall therebetween.

Certain features herein shown and described are shown, described and claimed in my co-pending application, Serial No. 285,981, filed November 6, 1905, and accordingly are not claimed herein.

Having described my invention, what I claim as new and desire to secure by Letters Patent is:—

1. In apparatus of the class described, in combination, an axle, a truck mounted upon said axle, a pair of members mounted respectively upon the upper and lower sides of said truck at each side thereof and projecting beyond the same, said members being provided with substantially opposite longitudinally-extending slots, a cross member interposed between said slotted portions of said first-mentioned members, bolts passing through said slots and the ends of said cross member, a dynamo mounted upon said cross member, and power-transmitting means connecting said dynamo and said axle.

2. In apparatus of the class described, in combination, an axle, a truck mounted upon said axle, a pair of members secured to said truck at each side thereof, each of said members being slotted in a longitudinal direction, a cross member having its ends positioned between said members at each side of said truck and having in each end a slot extending in a direction transverse of said truck, bolts passing through said slots in said cross member and said first-mentioned members, a dynamo mounted upon said cross member, and power-transmitting means connecting said dynamo and said axle.

3. In apparatus of the class described, in combination, an axle, a truck, a member secured upon said truck at each side thereof, a cross-bar stretched between said members, said members being provided with slots and the ends of said cross-bar being provided with slots transversely disposed with reference to said first slots, a dynamo mounted upon said cross-bar, a pulley upon said axle, a pulley upon said dynamo, a belt connecting said pulleys, and resilient adjustable means adapted to tend to swing said dynamo away from said axle.

4. In apparatus of the class described, in combination, an axle, a truck, a member secured upon said truck at each side thereof, a cross-bar stretched between said members, said members being provided with slots and the ends of said cross-bar being provided with slots transversely disposed with reference to said first slots, a dynamo mounted upon said cross-bar, a pulley upon said dynamo, a pulley upon said axle, a belt connecting said pulleys, a member upon said truck projecting beyond said dynamo, and resilient adjustable means connecting the projecting end of said member with said dynamo adapted to tend to draw said dynamo away from said axle.

5. In apparatus of the class described, in combination, an axle, a truck mounted upon said axle, a pair of members secured upon each side of said truck, said members being slotted in a direction longitudinal of the truck, a cross member having its ends between said pairs of members and having each end slotted in a transverse direction, a bolt passing through the slots on each side of said truck, a dynamo suspended from said cross member, a pulley upon said dynamo, a pulley upon said axle, a belt connecting said pulleys, one of the members of each of said pairs of members projecting beyond said dynamo, a cross member connecting the free ends of said projecting members, and resilient adjustable means connecting said dynamo with said second cross member and adapted to tend to swing the same away from said axle.

6. In apparatus of the class described, in combination, an axle, a dynamo, power transmitting means interposed between said dynamo and said axle, means adapted to permit adjustment of the position of said dynamo in a direction substantially parallel to said axle, and means adapted to hold said dynamo in any one of various positions in the direction of said adjustment.

7. In apparatus of the class described, in combination, an axle, a truck mounted upon said axle, a dynamo suspended from said truck and positioned beneath its point of suspension, power transmitting means connecting said axle and said dynamo, means adapted to permit adjustment of the point of suspension of said dynamo in a longitudinal direction, and means adapted to hold said point of suspension in any one of various positions in said direction of adjustment.

8. In apparatus of the class described, in combination, an axle, a truck mounted upon said axle, a dynamo suspended from said truck and positioned beneath its point of suspension, power transmitting means connecting said axle and said dynamo, means adapted to permit the adjustment of the point of suspension of said dynamo in either a lateral or a longitudinal direction, and means adapted to hold said point of suspension in any one of various positions in said directions of adjustment.

9. In apparatus of the class described, in combination, an axle, a truck, a member secured upon said truck at each side thereof, a cross bar stretched between said members, said members being provided with longitudinally disposed slots and the ends of said cross bar being provided with transversely disposed slots, means disposed within said slots and adapted to hold said cross bar in various positions, a dynamo mounted upon said cross bar, and power transmitting means connecting said dynamo and said axle.

In testimony whereof I affix my signature, in the presence of two witnesses.

WILLIAM I. THOMSON.

Witnesses:
 A. C. MOORE,
 ELMER E. ALLBEE.